United States Patent
Akaiwa et al.

(10) Patent No.: US 8,019,460 B2
(45) Date of Patent: Sep. 13, 2011

(54) NUMERICAL CONTROLLER OF MACHINE TOOL

(75) Inventors: Noritaka Akaiwa, Aichi (JP); Koji Eba, Aichi (JP)

(73) Assignee: Okuma Corporation, Aichi (JP)

( * ) Notice: Subject to any disclaimer, the term of this patent is extended or adjusted under 35 U.S.C. 154(b) by 575 days.

(21) Appl. No.: 12/207,122

(22) Filed: Sep. 9, 2008

(65) Prior Publication Data

US 2009/0082900 A1 Mar. 26, 2009

(30) Foreign Application Priority Data

Sep. 20, 2007 (JP) ................................. 2007-243291

(51) Int. Cl.
G05B 9/02 (2006.01)
G05B 19/10 (2006.01)
G06F 19/00 (2011.01)
G05D 1/02 (2006.01)
G05D 1/10 (2006.01)

(52) U.S. Cl. .......... 700/177; 700/79; 700/178; 700/186; 700/190; 700/192; 700/302; 318/563; 318/567

(58) Field of Classification Search .................. 318/563, 318/567; 700/79, 177, 178, 186, 190, 192, 700/302
See application file for complete search history.

(56) References Cited

U.S. PATENT DOCUMENTS

| | | | | | |
|---|---|---|---|---|---|
| 3,802,622 | A | * | 4/1974 | Nishimura et al. | 318/563 |
| 4,723,219 | A | * | 2/1988 | Beyer et al. | 700/190 |
| 4,980,627 | A | * | 12/1990 | Joboji et al. | 318/570 |
| 5,097,587 | A | * | 3/1992 | Yasuda | 483/6 |
| 5,777,450 | A | * | 7/1998 | Kono et al. | 318/568.11 |
| 5,808,893 | A | * | 9/1998 | Pugh et al. | 700/193 |
| 5,814,956 | A | * | 9/1998 | Kono et al. | 318/380 |
| 7,034,491 | B2 | * | 4/2006 | Kozai et al. | 318/570 |

FOREIGN PATENT DOCUMENTS

| | | |
|---|---|---|
| JP | 8-227307 | 9/1996 |
| JP | 2002-182714 | 6/2002 |
| JP | 2006195862 A | 7/2006 |

OTHER PUBLICATIONS

Office Action in Japanese Patent Application No. 2007-243291, Dated Jan. 4, 2011 (4 Pages with English Translation).
English Patent Abstract of JP2006-195862 from esp@cenet. Published Jul. 27, 2006 (1 Page).
esp@cenet patent abstract for Japanese Publication No. 2002182714, Publication date Jun. 26, 2002 (1 page).
esp@cenet patent abstract for Japanese Publication No. 8227307, Publication date Sep. 3, 1996 (1 page).

* cited by examiner

Primary Examiner — Ronald Hartman, Jr.
(74) Attorney, Agent, or Firm — Osha • Liang LLP

(57) ABSTRACT

A numerical controller having a function-generating unit which executes function generation for shaft movement according to a machining program is provided, the numerical controller further comprising a unit which stores shape data of the movable unit and shape data of an interfering structure; a retracting direction determining unit which determines a retracting direction; an interference checking position calculating unit which successively calculates, as an interference checking position, a position in which a desired distance is added to the current position of the movable unit according to the determined retracting direction; an interference confirming unit which confirms presence or absence of interference between the shape data of the movable unit and the shape data of the interfering structure by virtually moving the shape data of the movable unit; and a power outage detecting unit which sends a power outage signal to a DC power supply unit and the function-generating unit during power outage, wherein the function-generating unit executes function generation according to a result of the interference confirming unit.

4 Claims, 6 Drawing Sheets

NUMERICAL CONTROLLER OF MACHINE TOOL

CROSS-REFERENCE TO RELATED APPLICATIONS

This application claims priority to Japanese Patent Application No. 2007-243291 filed on Sep. 20, 2007, which is incorporated herein by reference in its entirety.

BACKGROUND OF THE INVENTION

1. Field of the Invention

The present invention relates to a numerical controller which controls a shaft movement of a movable unit of a machine tool and which avoids a mechanical collision between the movable unit and an interfering structure in the event of a power outage.

2. Description of the Related Art

In a numerical controller, when a shaft movement is instructed by a machining program, a function is generated for each shaft-controlling period according to the movement direction, and the shaft movement of the moving unit of the machine tool is controlled. FIG. 5 is a block diagram of such a control technique.

In FIG. 5, first, a machining program is input from a program-inputting unit 1 and is sent to a program-analyzing unit 2. The program-analyzing unit 2 generates data of a feed direction and sends the data to a function-generating unit 3 as an instruction.

Upon receiving the instruction, the function-generating unit 3 generates a function to start calculation of the function-generating position for each shaft-controlling period and decelerate and stop the movable unit to a target position, in order to control the shaft movement of the movable unit of the machine tool. During the calculation of the function-generating position, reference is made to feed speed data which are set and stored in advance by a feed speed data storage unit (not shown) as a unit amount of acceleration or deceleration for each control shaft and each control period, and the function generation position is calculated such that the shaft of the movable body moves at a predetermined acceleration and a predetermined speed. The calculated function generation position is sent to a servo drive unit 5 for each shaft-controlling period.

On a side of an alternating current (AC) power supply of a DC power supply unit 4, for example, a three-phase AC power supply is connected as an input power supply, and a smoothing capacitor (not shown) is connected and built into a direct current (DC) side power supply terminal portion. The servo drive unit 5 is connected to the DC-side power supply terminal. Depending on the mechanical structures, a plurality of servo drive units 5 may be connected to the DC-side power supply terminal of the DC power supply unit 4.

In the servo drive unit 5, supply of the DC power from the DC power supply unit 4 is received, and a current is supplied to a servo motor 6 to drive the movable unit of the machine tool based on the function generation position received from the function-generating unit 3. During the deceleration, a regeneration energy generated by the deceleration is returned to the AC power supply through the servo drive unit 5 and the DC power supply unit 4.

The actual machining will now be described with reference to FIG. 6. FIG. 6 shows a machining operation performed by a machining center, and a workpiece W is machined by a tool T moving in a direction of a cutting instruction vector Vc(t) in a Z negative direction while the tool T rotates. Upon occurrence of a power outage during such a machining operation, the supply of the three-phase AC power to the DC power supply unit is stopped, resulting in inability to generate the DC power supply to the servo drive unit 5, and, consequently, stoppage of the supply of current from the servo drive unit 5 to the servo motor 6. As a result, the spindle motor which rotates and drives the tool T and the servo motor 6 which drives the feed shaft are decelerated and stopped because the power from the servo drive unit 5 is stopped.

In addition, because the power supply to the numerical controller stops upon occurrence of power outage during machining, the function generation is stopped in the middle of the function generation. Because of this, for example, if the cutting process has been applied while synchronizing the X axis and the Y axis, the synchronization of the X axis and the Y axis is disturbed by the stoppage of the function generation, and the tool is decelerated and stopped independently for each axis. More specifically, the tool T decelerates and stops while the rotating tool T is engaged in the workpiece W, and there arises a problem that the workpiece is wasted and the tool is damaged at the same time.

As a method of resolving the problem during the power outage as described above, there is known a method in which the tool is retracted in a direction (positive Z direction in FIG. 6) opposite the axis along which the tool moves downward due to gravity (for example, the negative Z direction in FIG. 6) by a fixed amount of retracting. In this retracting method, because the retracting direction and the retracting amount are uniform, there is a problem in that, if there is an interfering structure in the retracting direction, the interfering structure interferes with the movable unit. In addition, JP Hei 8-227307 A discloses a method of retracting the tool in a direction away from an interference position of the tool and the workpiece. In this retracting method, however, because the retracting direction is uniform, there still remains the problem that, if there is an interfering structure in the retracting direction, the movable unit interferes with the interfering structure.

There also is a method in which the retracting direction and the retracting amount are designated in the machining program in advance and the tool is retracted in the retracting direction designated in the machining program and by the designated retracting amount during power outage, in order to resolve the above-described problem. In this retracting method, because the retracting direction and the retracting amount are designated in the machining program, there is a problem that the machining program becomes complex and the machining program generating operation becomes complicated. In addition, there also is a problem that the program must be changed when the machine target tool is changed from a vertical machining center to a horizontal machining center or when coordinates are converted through mirroring processing on the tool.

The present invention has been conceived in view of the above-described circumstances, and an advantage of the present invention is provision of a numerical controller which enables fine control of shaft movement upon occurrence of a power outage so that collision between the workpiece and the movable unit such as the tool can be avoided safely, reliably, and precisely. Documents describing the related art include JP Hei 8-227307 A and JP 2002-182714 A.

SUMMARY OF THE INVENTION

According to one aspect of the present invention, there is provided a numerical controller of a machine tool which controls movement of a movable unit of a machine tool, the numerical controller comprising a shape data storage unit which stores movable unit shape data which indicate a position and a shape of the movable unit and interfering structure shape data which indicate a position and a shape of an interfering structure with respect to the movable unit; a retracting direction determining unit which determines, on the basis of a current position and a movement control direction of the movable unit, a retracting direction of the movable unit during power outage (hereinafter called a "retracting direction of the movable unit for power outage"); an interference determining unit which determines, on the basis of the movable unit shape data and the interfering structure shape data, presence or absence of interference between the movable unit and the interfering structure when the movable unit is moved in the retracting direction for power outage which is determined by the retracting direction determining unit; a retracting position calculating unit which determines, on the basis of a determination result of the interference determining unit, an amount of retracting of the movable unit in the retracting direction for power outage which is determined by the retracting direction determining unit, and calculates a retracting position for power outage on the basis of the retracting direction for power outage and the amount of retracting; and a power outage detecting unit which detects that supply of power to the numerical controller of machine tool is stopped, wherein, when the power outage detecting unit detects stopping of the supply of the power, the movable unit is retracted to the retracting position for power outage.

According to another aspect of the present invention, preferably, in the numerical controller of machine tool, the retracting direction determining unit determines, on a plane which forms a predetermined angle with the movement control direction of the movable unit, a plurality of retracting vectors having their origin at a position of the movable unit; calculates, on the basis of the movable unit shape data and the interfering structure shape data, a relative distance between the movable unit and the interfering structure for each of directions of the retracting vectors; and determines, as the retracting direction for power outage, a direction of a retracting vector selected from among the plurality of retracting vectors on the basis of the relative distance.

According to another aspect of the present invention, preferably, in the numerical controller of machine tool, the retracting direction determining unit determines, on a plane which forms a predetermined angle with the movement control direction of the movable unit, a plurality of retracting vectors having their origin at a position of the movable unit; calculates, for each of the retracting vectors, a change, with respect to time during retracting of a movable unit, of energy in which a kinetic energy of the movable unit and a potential energy of the movable unit are added; and determines, as the retracting direction for power outage, a direction of a retracting vector selected from among the plurality of retracting vectors on the basis of the change with respect to time during retracting.

According to another aspect of the present invention, preferably, in the numerical controller of machine tool, the interference determining unit comprises an interference checking position calculating unit which calculates, as an interference checking position, a position in which an amount of retracting for checking is added to the current position of the movable unit in the retracting direction for power outage which is determined by the retracting direction determining unit; and an interference confirming unit which checks, on the basis of the movable unit shape data and the interfering structure shape data, presence or absence of an overlap between the movable unit and the interfering structure when the movable unit is moved to the interference checking position, determines that there is an interference when there is an overlap, and determines that there is no interference when there is no overlap, and the retracting position calculating unit determines the retracting position on the basis of the retracting direction determined by the retracting direction determining unit and the amount of retracting for checking which is determined by the interference confirming unit confirming that there is no interference.

According to various aspects of the present invention, there can be provided a numerical controller which can safely, reliably, and precisely avoid collision of the movable unit and the interfering structure even in the event of power outage.

BRIEF DESCRIPTION OF THE DRAWINGS

Preferred embodiments of the present invention will be described in detail by reference to the drawings, wherein.

DESCRIPTION OF THE PREFERRED EMBODIMENT

Figure 1:
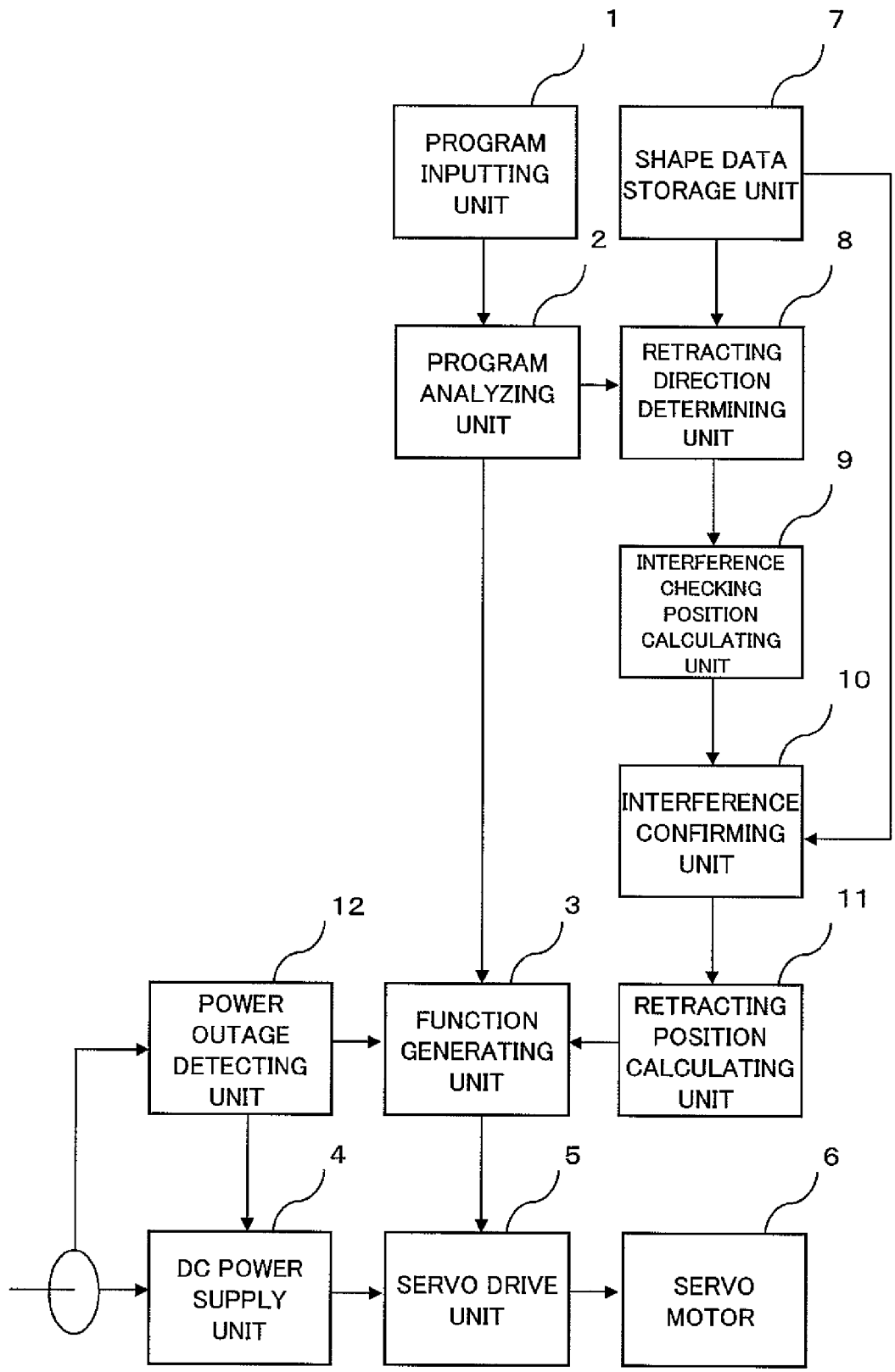
FIG. 1 is a block diagram showing a configuration of a numerical controller of a preferred embodiment according to the present invention.
Figure 5:
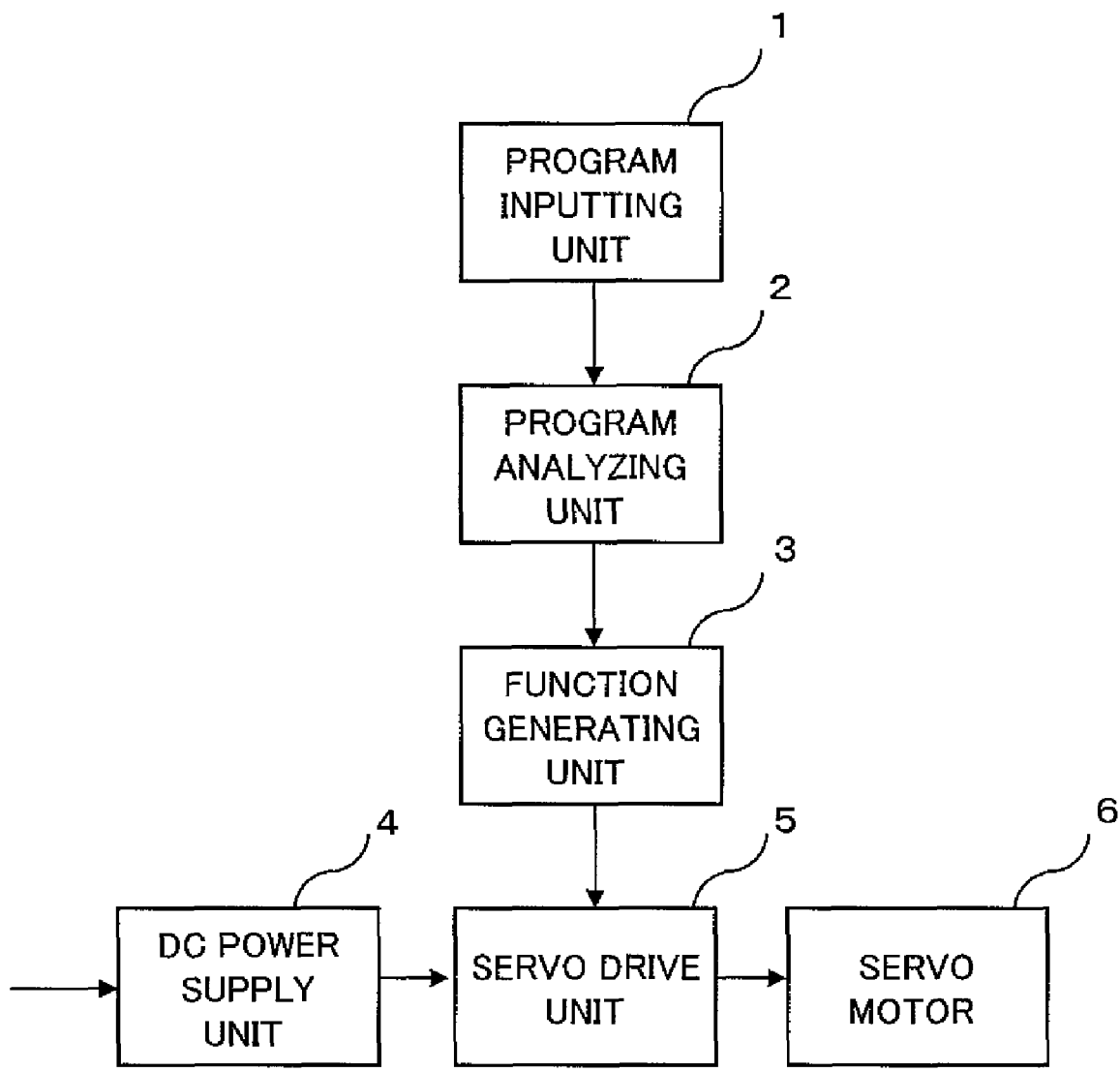
FIG. 5 is a block diagram of a controller.
Figure 6:
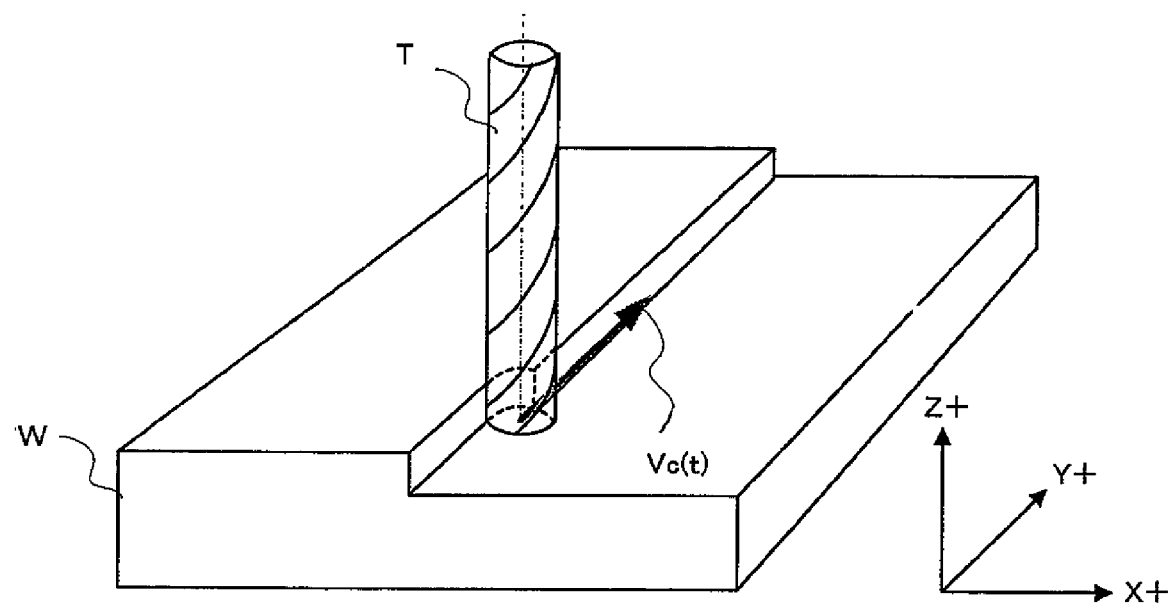
FIG. 6 is a diagram for explaining a specific operation performed in a machining center.

FIG. 1 is a block diagram showing an example structure of a numerical controller according to a preferred embodiment of the present invention, having a collision avoiding function when power outage occurs. Reference numerals 1, 2, 4, 5, and 6 represent structures identical to those of FIG. 5, and will not be described again. A shape data storage unit 7 registers and stores, in addition to shape data which indicate a position and a shape of a movable unit of a machine tool such as a tool, shape data which indicate a position and a shape of a workpiece, a jig, and a mechanical interfering structure which may interfere when the shaft of the movable unit of the machine tool is moved. Among these, the movable unit moving by the shaft movement and the interfering structure which may interfere due to the movement differ depending on the structure of the machine tool, and are not particularly limited to those described in the following description.

In order to determine the retracting direction on the basis of the shape data received from the shape data storage unit 7, a retracting direction determining unit 8 successively calculates a vector, from among cross points between the retracting vectors and the interfering structure on a plane perpendicular to the movement direction of the feed shaft for which an instruction is received from the program analyzing unit 2, in which vector the relative distance from the current position is the longest. The interference distance with the interfering structure in each of the directions of the vectors is determined, and the vector having the longest distance is ultimately determined as the retracting direction.

In order to enable confirmation of presence/absence of the interference on the basis of the shape data of the movable unit and the shape data of the interfering structure, an interference checking position calculating unit 9 successively calculates, as an interference checking position, a position moved from the current position of the movable unit by a desired amount of retracting according to the determined retracting direction.

An interference confirming unit 10 checks, on the basis of the shape data of the movable unit and the shape data of the interfering structure, presence or absence of an overlap within, for example, a three-dimensional space between the movable unit and the interfering structure when the movable unit is successively, virtually moved to the interference checking position; confirms that there is an interference when there is an overlap; and confirms that there is no interference when there is no overlap. When it is determined that there is an interference, the interference checking position calculating unit 9 again calculates the interference checking position.

A retracting position calculating unit 11 calculates a retracting position on the basis of the retracting direction determined by the retracting direction determining unit 8 and the amount of retracting which is determined by the interference confirming unit 10 such that there is no interference. The calculated retracting position is sent to the function-generating unit 3.

A power outage detecting unit 12 monitors for power outage on a side of the AC power supply of the DC power supply unit 4; for example, the three-phase AC power supply, and, upon detection of power outage of the AC power supply, the power outage detecting unit 12 transmits a power outage detecting signal to the DC power supply unit 4, and the DC power supply unit 4 stops regeneration of the power supply so that the accumulated power can be used for driving the feed shaft.

At the same time, the power outage detecting unit 12 sends a power outage detecting signal also to the function-generating unit 3. Upon receiving the power outage detecting signal, the function-generating unit 3 generates a function on the basis of the retracting position sent from the retracting position calculating unit 11, and sends the function generation result to the servo drive unit 5.

The servo drive unit 5 sends a desired current instruction to the servo motor 6 based on the sent generated function, and the servo motor 6 retracts the movable unit of the machine tool according to the current instruction.

Figure 3:
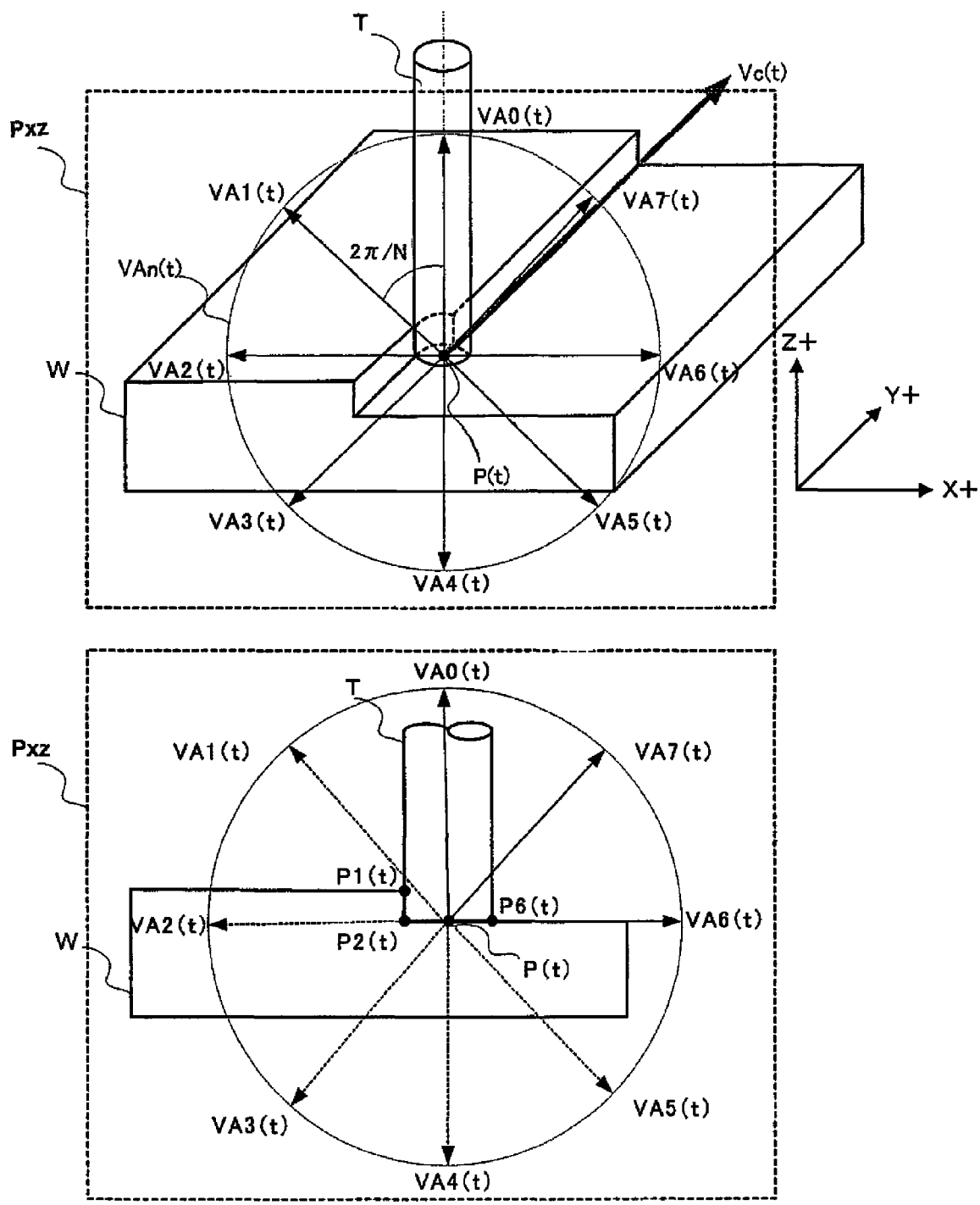
FIG. 3 is a diagram for explaining a specific operation in a machining center in a preferred embodiment according to the present invention.

Next, a method of determining the retracting direction and the retracting amount will be described with reference to FIG. 3. FIG. 3 illustrates machining performed by a machining center in which a tool T machines a workpiece W in a direction of a cutting instruction vector Vc (t) in a negative Z direction while the tool T rotates. A perpendicular plane (in FIG. 3, an XZ plane Pxz) which passes through the current position P(t) and which is perpendicular to the instruction vector Vc(t) is considered. Retracting vectors VAn(t) having their origin at the current position P(t) are defined on the perpendicular plane. For example, vectors in 8 directions are considered as the retracting vectors VAn(t) (The number n is an integer from 0 to 7.). As a result, vectors VA0($t$), VA1($t$), VA2($t$), VA3($t$), VA4($t$), VA5($t$), VA6($t$), and VA7($t$), which divide a circle centered at the current position P(t) by $2\pi/8$ [rad] (The number N in FIG. 3 is equal to the maximum value of the number n+1.), are defined. For the retracting vectors VAn(t), the maximum value of the number n does not need to be 7, and may be an arbitrary integer greater than or equal to 1.

First, determination of the retracting direction will be described. In order to determine the retracting direction on the basis of the shape data of the tool T and the shape data of the workpiece W, there is determined an interference distance from the retracting vector VAn(t) on the perpendicular plane (in FIG. 3, the XZ plane Pxz) perpendicular to the direction of the feed shaft which is received from the program-analyzing unit 2; that is, the instruction vector Vc(t) and the workpiece W which is an interfering structure for the tool T and other interfering structures (for example, structures used for setup), and a vector in which the relative distance from the current position P(t) is the longest is successively calculated. For the calculation of the cross point between the tool T and the interfering structure, the shape data of the tool T and the shape data of the interfering structure, etc. are used. In the case depicted in FIG. 3, the relationship between the tool T and the workpiece W on the XZ plane Pxz is determined as an interference when the tool T is moved in directions of retracting vectors VA1($t$)-VA6($t$), because the relationship is contact; that is, the relative distance is 0, for a line segment P1($t$)P2($t$)P6($t$). Therefore, the retracting direction is VA0($t$) or VA7($t$). The interference distance with other interfering structures (for example, structures used for setup) in each vector direction of the retracting vectors VA0($t$) and VA7($t$) is determined, and a vector having the longest relative distance is ultimately determined as the retracting direction. When all of the plurality of retracting vectors defined on the perpendicular plane of the instruction vector Vc(t) are determined as contact between the tool T and the workpiece W; that is, determined as an interference with relative distance of 0, such as in the case of the drill machining, the retracting direction cannot be determined with the above-described method. In this case, the retracting direction can be determined by generating the retracting vector on a plane which is parallel to the instruction direction Vc(t). Alternatively, the direction of the plane on which the retracting vectors are to be generated may be defined according to the contact status of the tool T and the workpiece W so that the retracting direction can be determined.

As another method of determining the final retracting direction on the basis of the plurality of retracting vectors, it is possible to retract in a direction in which power consumption by the servo motor 6 is small during the shaft movement. More specifically, an energy difference (kinetic energy+potential energy) between instruction of the retracting vectors during current timing tk and the instruction vector of the previous timing; that is, at (tk−1), may be determined from the following Equation 1. A vector in which the change with respect to time of the energy ΔE is the smallest is ultimately determined as the retracting vector.

$$\Delta E = \{½ \times Vn(tk)^2 - ½ \times V^2\} + \{P(tk) - P(tk-1)\} \times G \quad \text{(Equation 1)}$$

Here, Vn(t) represents the instruction vector, V represents a current speed, P(t) represents the current position, and G represents a gravity vector. When the unit which determines the retracting direction on the basis of the relative distance between the current position P(t) of the tool T and the interfering structure and the unit which determines the retracting direction on the basis of the change with respect to time of the energy are to be combined, it is preferable to select retracting vectors having a relative distance between the current position P(t) and the interfering structure exceeding a predetermined threshold value, and to select, as the ultimate retracting vector and from among the selected retracting vectors, a vector in which the change ΔE with respect to time of the energy is the smallest.

Next, the determination method of the retracting amount will be described. A position moved from the current position P(t) by a desired amount of retracting in the retracting vector direction determined as described above is set as an interference checking position. There is checked an overlap, for example, on the three-dimensional space, of the movable unit including the tool T and the interfering structure (for example, a structure used for setup) when the movable unit including the tool T (the overall movable unit is not shown) is virtually moved to the interference checking position. This check is based on the shape data of the movable unit including the tool T and the shape data of the interfering structure. When there is no overlap between the movable unit moved to the interference checking position and the interfering structure, it is possible to confirm that there is no interference, and the retracting amount is determined. When, on the other hand, there is an overlap between the movable unit moved to the interference checking position and the interfering structure, a position moved from the current position P(t) in the retracting vector direction determined as described above by an amount of retracting which differs from the amount of retracting which is used previously is set as a new interference checking position. The overlap between the movable unit including the tool T and the interfering structure is checked by reference to the new interference checking position.

In a state where a door is opened, there is a possibility that a part of the body of the operator is within the machining region. Therefore, it is effective to retract with a limited retracting amount when the door is in the opened state, in order to prevent contact between the movable unit and the part of the body of the operator by the mechanical operation unit. With the above-described process, the retracting direction and the retracting amount are determined. When the function-generating unit 3 receives the power outage detecting signal from the power outage detecting unit 12, the function-generating unit 3 generates a function according to the shaft movement stopping position calculated on the basis of the retracting direction and the retracting amount, to retract the tool T from the workpiece W. For the retracting of the tool T, the electric energy accumulated in the smoothing capacitor of the DC power supply unit 4 may be used.

Figure 4:
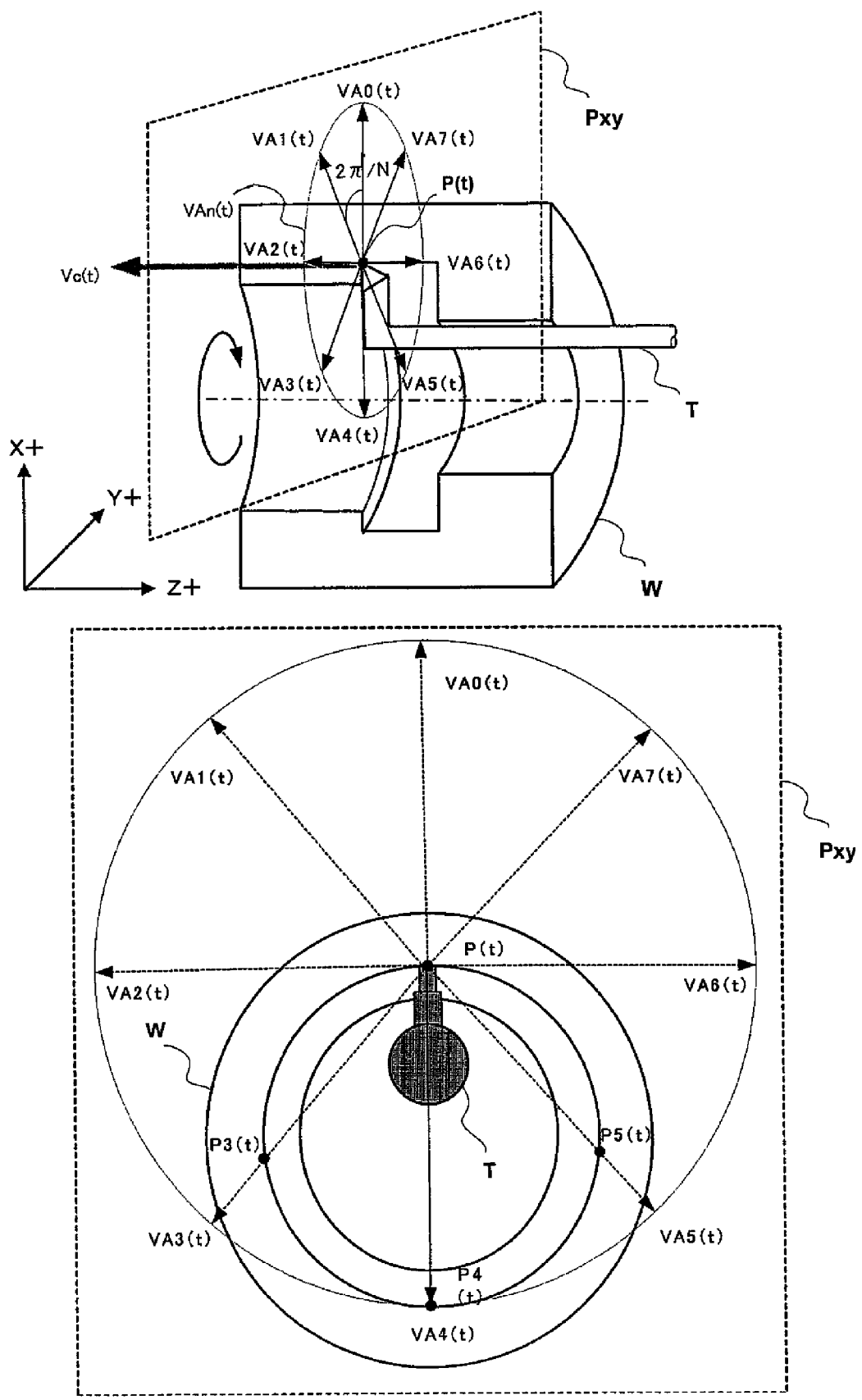
FIG. 4 is a diagram for explaining a specific operation performed on a lathe in a preferred embodiment according to the present invention.

The determination method of the retracting direction and the retracting amount of another machining will now be described with reference to FIG. 4. FIG. 4 is a cross sectional diagram showing machining performed by a lathe. A tool T is inserted to the inner side of the workpiece W while the workpiece W is rotated, and the tool T machines in the direction of the cutting instruction vector Vc(t) in the positive X direction. When the current position is P(t), a perpendicular plane (in FIG. 4, XY plane Pxy) passing through the current position and perpendicular to the instruction vector Vc(t) is considered. Retracting vectors VAn(t) having their origin at the current position P(t) are defined on the perpendicular plane. For example, vectors in 8 directions are defined with the number n(The number n is an integer from 0 to 7.) as the retracting vectors VAn(t). As a result, vectors VA0(t), VA1(t), VA2(t), VA3(t), VA4(t), VA5(t), VA6(t), and VA7(t), which divide a circle centered at the current position P(t) into $2\pi/8$ [rad] (The number N in FIG. 4 is equal to the maximum value of the number n+1.), are defined. With regard to the retracting vectors VAn(t), the maximum value of the number n does not need to be 7, and may be an arbitrary integer greater than or equal to 1.

First, the determination of the retracting direction will be described. In order to determine the retracting direction on the basis of the shape data of the tool T and the shape data of the workpiece W, a vector in which the relative distance from the current position P(t) is the longest is successively calculated from among crossing points between the retracting vectors VAn(t) on the plane (in FIG. 4, XY plane Pxy) perpendicular to the direction of the feed shaft received from the program-analyzing unit 2; that is, the instruction vector Vc(t) and the workpiece W which is an interfering structure for the tool T.

In the calculation of the crossing points between the tool T and the interfering structure, the shape data of the tool T and the shape data of the interfering structure, etc. are used. In the case depicted in FIG. 4, the relationship between the tool T and the workpiece W centered at the current position P(t) is contact; that is, the relative position is 0 at the point P(t), and the movements to the directions of the retracting vectors VA0(t), VA1(t), VA2(t), VA6(t), and VA7(t) are determined as interference. Therefore, possible retracting directions are VA3(t), VA4(t), and VA5(t). If the interference distances with the other interfering structures (the workpiece W in the case depicted in FIG. 4) are determined for each vector direction for the retracting vectors VA3(t), VA4(t), and VA5(t), the interference distances between the retracting vectors VA3(t), VA4(t), and VA5(t) and the workpiece W are line segments P(t)P3(t), P(t)P4(t), and P(t)P5(t), respectively, and, thus, the vector VA4(t) in which the distance is the longest is determined as the ultimate retracting direction. When all of the plurality of retracting vectors defined on the perpendicular plane of the instruction vector Vc(t) are determined as contact between the tool T and the workpiece W; that is, interference with a relative distance of 0, the retracting direction cannot be determined. In this case, the retracting direction can be determined by generating a retracting vector on a plane parallel to the instruction direction Vc(t). Alternatively, the direction of the plane on which the retracting vector is to be generated may be determined based on the contacting status of the tool T and the workpiece W, so that the retracting direction can be determined.

Next, the determination method of the retracting amount will be described. A position moved from the current position P(t) in the direction of the retracting vector VA4(t) determined as described above by a desired retracting amount is set as an interference checking position. Then, an overlap in, for example, the three-dimensional space, of the movable unit including the tool T and the interfering structure (in the case depicted in FIG. 4, the workpiece W and the interfering structure present outside of the workpiece W) is checked for a case where the movable unit including the tool T (the overall movable unit is not shown) is virtually moved to the interference checking position. This check is executed based on the shape data of the movable unit including the tool T and the shape data of the interfering structure. When there is no overlap between the movable unit moved to the interference checking position and the interfering structure, it is confirmed that there is no interference, and the retracting amount is determined. When, on the other hand, there is an overlap between the movable unit moved to the interference checking position and the interfering structure, a position moved from the current position P(t) in the retracting vector direction determined as described above by a retracting amount which differs from the retracting amount which is previously used is set as a new interference checking position. On the basis of the new interference checking position, the overlap between the movable unit including the tool T and the interfering structure is checked.

The retracting direction and the retracting amount are determined as described above. When the function-generating unit 3 receives the power outage detecting signal from the power outage detecting unit 12, the function-generating unit 3 generates a function according to the stopping position of the shaft movement calculated based on the retracting direction and the retracting amount, and the tool T is retracted from the workpiece W. For the retracting of the tool T, the electric energy accumulated in the smoothing capacitor of the DC power supply unit 4 may be used.

Figure 2:
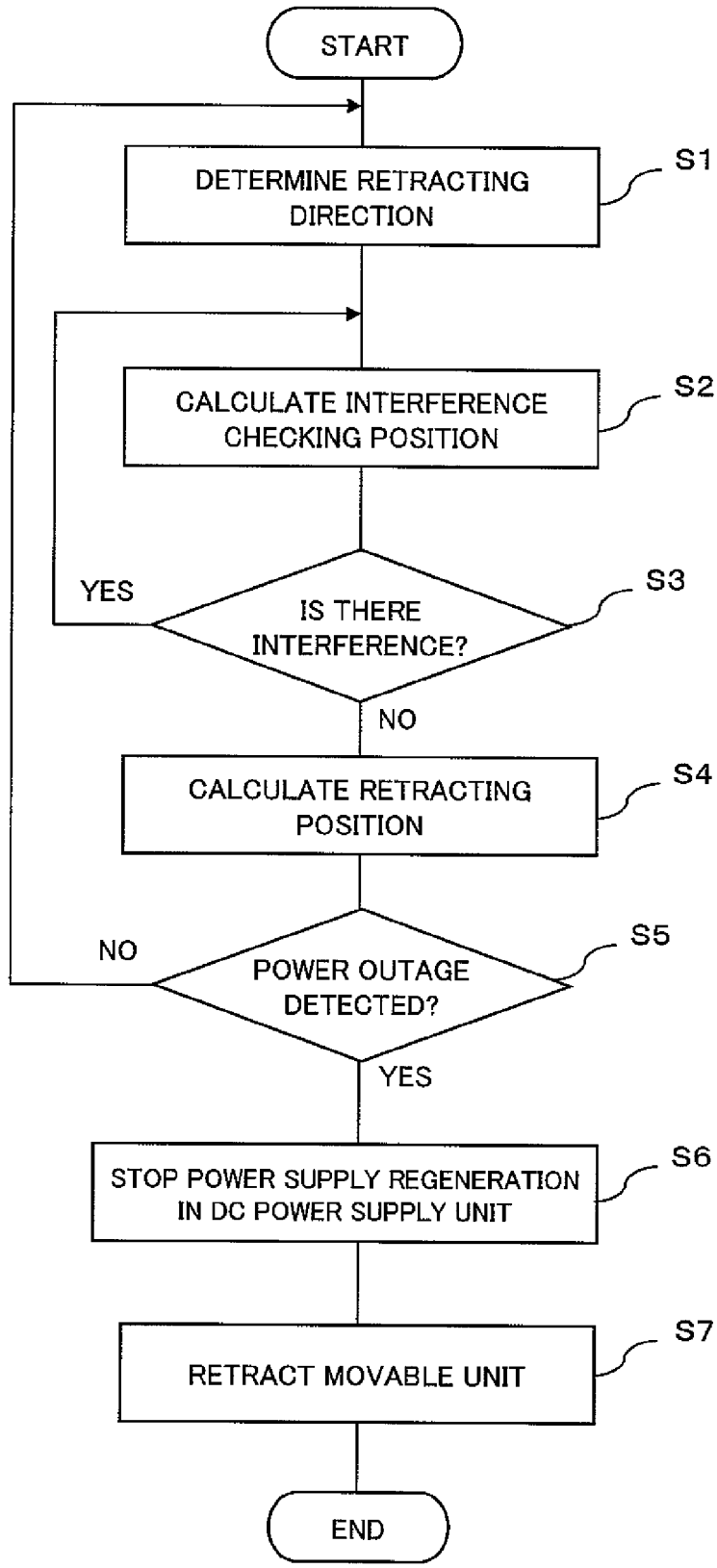
FIG. 2 is a flowchart showing an example of a control method in a preferred embodiment according to the present invention.

Next, a process flow in the present embodiment will be described with reference to FIG. 2. In step S1, in order to determine the retracting direction using the shape data of the tool T and the shape data of the workpiece W, a vector in which the relative distance from the current position Pc is the longest is successively calculated from among crossing points between retracting vectors VAn(t) on a plane perpendicular to the direction of the feed shaft received from the program-analyzing unit 2; that is, the instruction vector Vc(t) and the workpiece W which is the interfering structure. The interference distance with the interfering structure in each of the directions of the vectors is determined, and a vector with the longest distance is determined ultimately as the retracting direction. In step S2, a position moved from the current position P(t) in the retracting vector direction determined as described above by a desired amount of retracting is set as the interference checking position. In step S3, there is checked an overlap in, for example, the three-dimensional space, between the movable unit including the tool T and the interfering structure when the shape data of the movable unit including the tool T is virtually moved to the interference checking position. This check is executed based on the shape data of the movable unit and the shape data of the interfering structure received from the shape data storage unit 7. When there is no overlap between the movable unit moved to the interference checking position and the interfering structure, it is confirmed that there is no interference, and the retracting amount is determined. When it is confirmed that there is an interference, the process returns to step S2, and an interference checking position which differs from the previous interference checking position is calculated. When, on the other hand, it is confirmed that there is no interference, the process proceeds to step S4. In step S4, a retracting position considering the present position P(t) and the determined retracting amount is calculated based on the result of step S3. The retracting position calculating unit 11 sends the calculated retracting position to the function-generating unit 3. In step S5, if the power outage detecting unit 12 does not detect the power outage; that is, during a normal time, the process returns to step S1. When, on the other hand, the power outage detecting unit 12 detects power outage, the process proceeds to step S6. In step S6, the power supply regeneration from the side of the DC power supply to the side of the AC power supply is stopped by the power outage detecting signal sent from the power outage detecting unit 12, and the electric power is accumulated on the DC bus line of the DC power supply unit 4. In step S7, the servo drive unit 5 supplies power to the servo motor 6 using the power accumulated in the DC power supply unit 4, and the movable unit is retracted.

According to the numerical controller of the present embodiment, interference check using the shape data is constantly executed, and the function can be generated based on the result of the interference check to retract the movable unit to a non-interfering direction. Because of this, it is possible to safely, reliably, and precisely avoid collision between the movable unit and the interfering structure even in the event of power outage.

What is claimed is:

1. A numerical controller of a machine tool which controls movement of a movable unit of a machine tool, the numerical controller comprising:
    a shape data storage unit which stores movable unit shape data which indicate a position and a shape of the movable unit and interfering structure shape data which indicate a position and a shape of an interfering structure with respect to the movable unit;
    a retracting direction determining unit which determines, on the basis of a current position and a movement control direction of the movable unit, a retracting direction of the movable unit for power outage;
    an interference determining unit which determines, on the basis of the movable unit shape data and the interfering structure shape data, presence or absence of interference between the movable unit and the interfering structure when the movable unit is moved in the retracting direction for power outage as determined by the retracting direction determining unit;
    a retracting position calculating unit which determines, on the basis of a determination result of the interference determining unit, an amount of retracting of the movable unit in the retracting direction for power outage which is determined by the retracting direction determining unit, and calculates a retracting position for power outage, on the basis of the retracting direction for power outage and the amount of retracting; and
    a power outage detecting unit which detects that supply of power to the numerical controller of machine tool is stopped, wherein
    when the power outage detecting unit detects stoppage of the supply of power, the movable unit is retracted to the retracting position for power outage.

2. The numerical controller of machine tool according to claim 1, wherein
    the retracting direction determining unit determines, on a plane which forms a predetermined angle with the movement control direction of the movable unit, a plurality of retracting vectors having their origin at a position of the movable unit; calculates, on the basis of the movable unit shape data and the interfering structure shape data, a relative distance between the movable unit and the interfering structure for each of directions of the retracting vectors; and determines, as the retracting direction for power outage, a direction of a retracting vector selected from among the plurality of retracting vectors on the basis of the relative distance.

3. The numerical controller of machine tool according to claim 1, wherein
    the retracting direction determining unit determines, on a plane which forms a predetermined angle with the movement control direction of the movable unit, a plurality of retracting vectors having their origin at a position of the movable unit; calculates, for each of the retracting vectors, a change, with respect to time during retracting of a movable unit, of energy in which a kinetic energy of the movable unit and a potential energy of the movable unit are added; and determines, as the retracting direction for power outage, a direction of a retracting vector selected from among the plurality of retracting vectors on the basis of the change with respect to time during retracting.

4. The numerical controller of machine tool according to claim 1, wherein
    the interference determining unit comprises:
    an interference checking position calculating unit which calculates, as an interference checking position, a position in which an amount of retracting for checking is added to the current position of the movable unit in the retracting direction during power outage which is determined by the retracting direction determining unit; and
    an interference confirming unit which checks, on the basis of the movable unit shape data and the interfering structure shape data, presence or absence of an overlap between the movable unit and the interfering structure when the movable unit is moved to the interference checking position, determines that there is an interference when there is an overlap, and determines that there is no interference when there is no overlap, and the retracting position calculating unit determines the retracting position on the basis of the retracting direction determined by the retracting direction determining unit and the amount of retracting for checking which is determined by the interference confirming unit confirming that there is no interference.

* * * * *